2,692,053

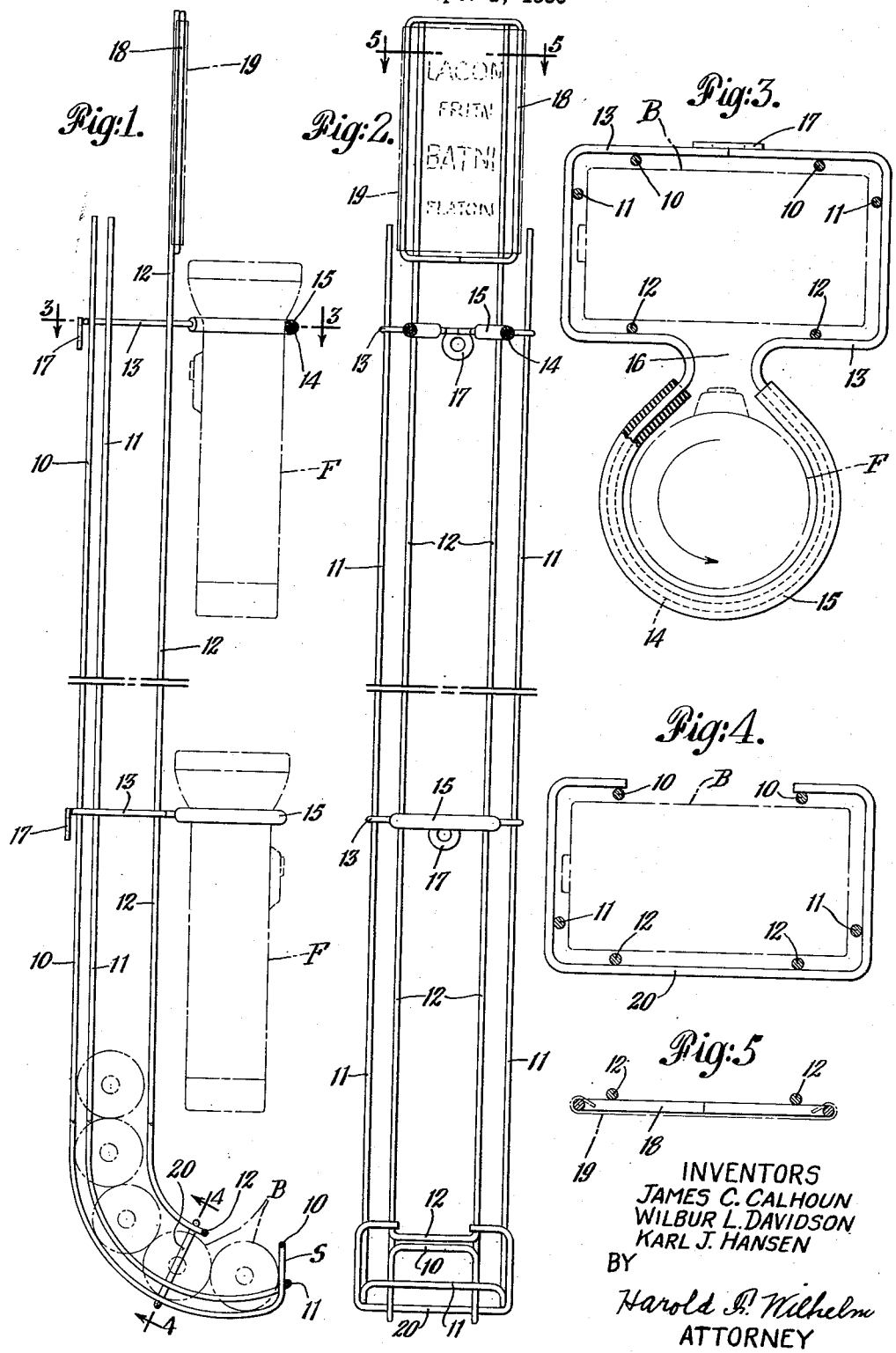
Oct. 19, 1954    J. C. CALHOUN ET AL    2,692,053
MERCHANDISING RACK FOR FLASHLIGHTS, BATTERIES AND THE LIKE
Filed Sept. 1, 1950
INVENTORS
JAMES C. CALHOUN
WILBUR L. DAVIDSON
KARL J. HANSEN
BY
Harold P. Wilhelm
ATTORNEY Patented Oct. 19, 1954

UNITED STATES PATENT OFFICE 2,692,053

MERCHANDISING RACK FOR FLASHLIGHTS, BATTERIES, AND THE LIKE

James C. Calhoun, New Haven, and Wilbur L. Davidson, Canterbury, Conn., and Karl J. Hansen, Forest Hills, N. Y., assignors to Olin Industries, Inc., New Haven, Conn., a corporation of Delaware Application September 1, 1950, Serial No. 182,874

1 Claim. (Cl. 211—49)

The invention relates to display and merchandising devices and, more particularly, to a device of this kind for displaying and merchandising flashlights and batteries.

An object of the invention is to provide a device of this character which will attract the attention of prospective purchasers of batteries and flashlights; which will facilitate selling the batteries and flashlights, and yet which will discourage pilfering.

According to a preferred embodiment of the invention, the merchandising and display device comprises a wire rack adapted to be supported on a vertical wall. The rack is made up of spaced, vertically extending wire members and a series of wire cross members arranged to form a chute; the chute holds the batteries and has provision to dispense them, one by one. The cross members incorporate cushioning rings which project out from the front of the rack to hold a series of flashlights. The rings each have a restricted throat at the back. To position the flashlight, its switch member must be passed through the throat after which the flashlight is rotated to bring the switch member under the ring. To disengage a flashlight, this process must be reversed, thus discouraging pilfering.

The invention also consists in certain new and original features and combinations hereinafter set forth and claimed.

Although the novel features which are believed to be characteristic of this invention will be particularly pointed out in the claim appended hereto, the invention itself, as to its objects and advantages, and the manner in which it may be carried out, may be better understood by referring to the following description taken in connection with the accompanying drawings forming a part hereof, in which:

Fig. 1 is a side elevation of the wall rack according to the invention, showing batteries and flashlights in place;

Fig. 2 is a front elevation of the wall rack, an intermediate part of the length being broken away to meet space limitations of the patent sheet;

Fig. 3 is a section on the line 3—3 of Fig. 1;

Fig. 4 is a section on the line 4—4 of Fig. 1; and

Fig. 5 is a section on the line 5—5 of Fig. 2.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring to the drawing, the wall rack is made up generally of wire stock suitably bent, as shown. The rack comprises, generally, a series of vertical wires bent to form a chute which holds the flashlight batteries B and a series of wire cross members which hold the vertical wires in spaced relation and which hold the flashlights F. The wire elements are connected by welding at the points where they cross.

The rack comprises a pair of back rods 10, a pair of side rods 11 and a pair of front rods 12. These rod pairs are, respectively, made from a single wire bent to the shape as shown; the wires form horizontal bights or loops at the lower front of the rack, as indicated. To avoid confusion, these bights are indicated by the same reference characters as the wires of which they form a part.

These rod pairs form a chute in which the batteries B are slidably held. The bights forming parts of wires 10 and 11 form a stop, indicated generally by S, at the bottom of the rack for the batteries. The bight forming part of wire 12 is spaced from the stop S to form a delivery recess or dispensing opening from which the batteries may be lifted out of the rack, one by one, as explained below.

The vertical rods are connected by a series of flashlight-holding cross members 13, two being shown in Figs. 1 and 2. However, any number of flashlight-holding members may be used, depending upon the length of the rack. In practice, three is preferred.

Each cross member 13 comprises a rectangular frame or box portion disposed around the outside of the several vertical rods and a loop or ring portion 14, drawn together to form a throat or neck 16. These cross members are each formed from a single piece of wire, the ends of which meet at the back. These ends are suitably welded together and to an eyelet or grommet 17. The loops 14 may be covered by short lengths of rubber hose 15 suitably threaded onto the loops before the cross members are welded to the rack.

The bight forming part of wire 11 is suitably welded to the lower part of the wire 10 near the bight thereof. A U-shaped piece of wire 20 (Fig. 4) is suitably welded to the wires 10, 11 and 12 to hold the lower ends of these members in proper relationship.

The upper ends of back rods 10 and of side rods 11 extend above the uppermost cross member 13. The upper ends of the front rods 12 are disposed somewhat higher than rods 10 and 11, and have a supporting wire frame 18 welded thereto. Frame 18 in turn supports a display plate 19 whose vertical side margins are bent around the vertical portions of the supporting frame 18 to hold the plate in position. The display plate 19 may have suitable advertising matter thereon calling attention to the merchandise displayed.

It will be noted that the vertical rods and cross members form an open framework through which the batteries are visible on three sides. The open framework comprises a single chute for the batteries. It will be noted that the greater part of the chute comprises a vertical portion. The lower end of the vertical portion describes a gentle curve merging into a horizontal portion which carries the above-mentioned dispensing opening in its upper wall between the bights 10 and 12.

In use, the rack is suitably mounted on a vertical wall by passing fastening members (not shown) through the eyelets 17 into the wall. It is then filled with the batteries B to be displayed and sold. Each flashlight F is positioned in its rubber holder 15 by inserting the flashlight from above, with the switch of the flashlight in line with the throat or neck 16, to the position illustrated by the upper flashlight in Fig. 1. The flashlight is then rotated 180° to bring the switch to the front, as illustrated by the lower flashlight in Fig. 1. The cylindrical body of the flashlight has an easy fit with the rubber holder 15; the head of the flashlight, being larger, prevents the flashlight from falling through.

It will thus be seen that in order to remove a flashlight, it first must be rotated and then lifted out of its holder. This discourages pilfering. The rubber cushion rings prevent marring of the flashlight.

The batteries B may be dispensed by lifting them out of the dispensing opening between bights 10 and 12, one by one. As each battery is removed, the stack of batteries drops in the chute to the next lower position.

It will be noted that the several wires of the rack are so arranged that the top center contact of the battery cannot engage any metal; thus shortcircuiting of the battery by engagement of its bottom and its top central contact with the wire rack is prevented.

It will be noted further that the open nature of the chute makes the batteries clearly visible to prospective purchasers. The single chute has a comparatively large battery capacity, and coupled with the arrangement of aligned, longitudinally-spaced flashlights, makes an attractive display which invites the customer's attention and gives a most favorable impression.

While certain novel features of the invention have been disclosed herein, and are pointed out in the annexed claims, it will be understood that various omissions, substitutions and changes may be made by those skilled in the art without departing from the spirit of the invention.

What is claimed is:

In a merchandising and display device particularly for flashlights and batteries, a battery dispensing chute comprising an elongate vertical portion whose lower end describes a curve merging into a horizontal portion, said chute constituting an open framework and comprising a pair of upstanding front rods, a pair of upstanding side rods, one on each side, a pair of upstanding back rods, the lower ends of the side rods being secured to lower ends of the back rods to form a stop for the chute, the lower ends of the front rods being spaced from said stop to form therebetween a dispensing opening, a series of cross members, each comprising a frame extending around and secured to the outside of the upstanding rods, said cross members each being brought together at the front of the chute to form a restricted throat and merging into a flashlight-holding ring projecting forwardly of the chute, whereby the switch member of the flashlights supported in said rings must be in register with said throats in order to position or remove a flashlight.

References Cited in the file of this patent

UNITED STATES PATENTS

| Number | Name | Date |
|---|---|---|
| D. 161,477 | Lieber et al. | Jan. 2, 1951 |
| 886,534 | Myers | May 5, 1908 |
| 1,557,251 | Hamlin | Oct. 13, 1925 |
| 2,051,408 | Karst | Aug. 18, 1936 |
| 2,119,700 | Burgess | June 7, 1938 |
| 2,307,993 | Calhoun et al. | Jan. 12, 1943 |
| 2,467,411 | Tingdale | Apr. 19, 1949 |